Sept. 22, 1953  K. E. ERICSSON ET AL  2,652,852
FLOAT VALVE AND THE LIKE
Filed March 22, 1951  2 Sheets-Sheet 1
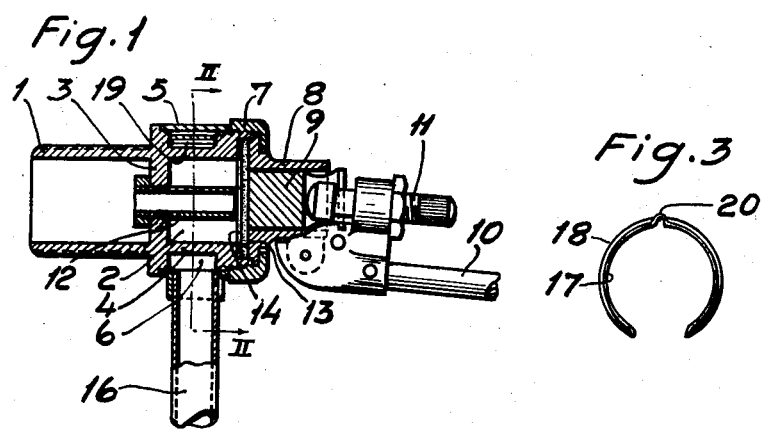
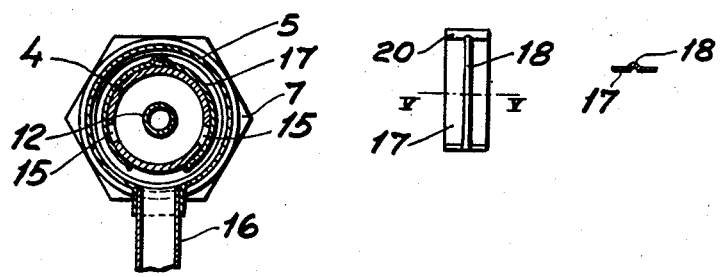
INVENTORS
KARL E. ERICSSON AND
ERNST G. A. GEBER
BY: Darby & Darby
ATTORNEYS

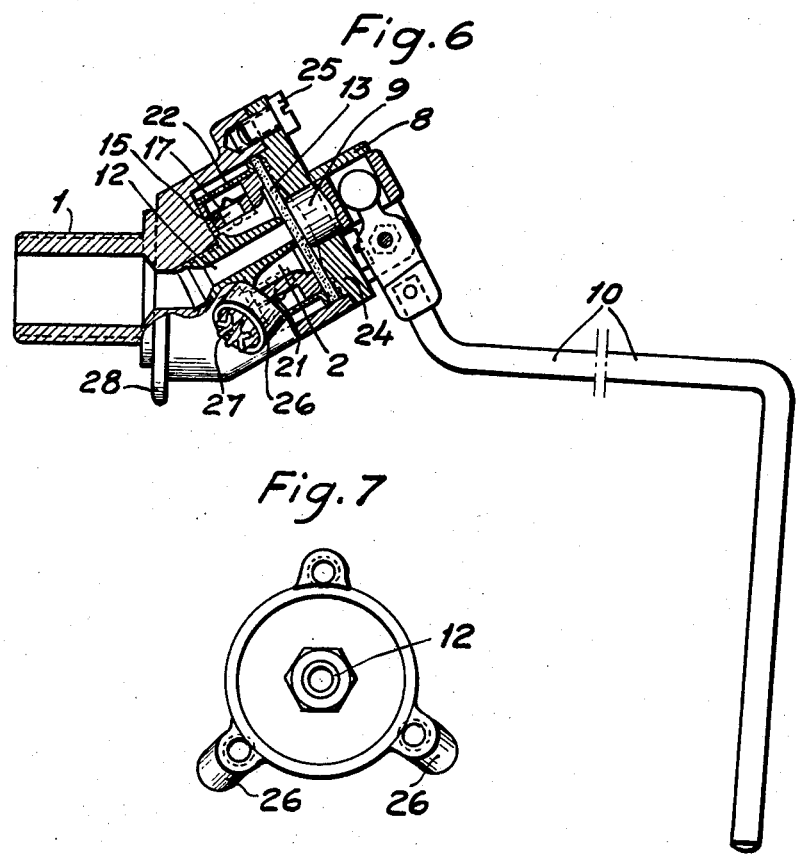

Patented Sept. 22, 1953

2,652,852

UNITED STATES PATENT OFFICE 2,652,852

FLOAT VALVE AND THE LIKE

Karl E. Ericsson and Ernst G. A. Geber, Sundbyberg, Sweden, assignors to Aktiebolaget Max Sievert, Sundbyberg, Sweden Application March 22, 1951, Serial No. 216,890
In Sweden May 8, 1950

4 Claims. (Cl. 137—416)

The present invention relates to a device in float valves for water tanks and the like, in which the movement of the float is transmitted to the valve so that the valve is opened when the float is moving downwardly, and is closed when the float is moving upwardly. The invention is substantially characterized in that the valve box is provided with a chamber in the inner wall of which there are provided one or more openings which communicate with one or more outlets provided in the outer wall of the valve box, said openings being adapted to be closed by means of a spring which is arranged to exert a certain resistance at the filling of the water tank so that an overpressure arises in the valve box which counteracts the elevating force acting on the float till the desired water level has been reached when, due to equalization of the overpressure, the valve is rapidly closed by the actuation of the elevating force acting on the float.

Two embodiments of the invention are shown by way of example in the accompanying drawing, in which—

Fig. 1 is a longitudinal section of the valve box in one embodiment.

Fig. 2 is a section on line II—II in Fig. 1.

Figs. 3 to 5 are a front view, a side view, and a section respectively, of a detail of the invention.

Fig. 6 is substantially a longitudinal section of the valve box in the other embodiment.

Fig. 7 is an end view of the valve box, the loose parts thereof being removed.

Figs. 8 and 9 are a side view, and a front view respectively, of a detail.

Figs. 10 and 11 are likewise a side view, and a front view respectively, of details.

In Fig. 1, the reference numeral 1 designates the inlet opening of the valve, said opening constituting part of the valve box, the inner hollow space of which is designated by 2 and serves as a pressure chamber. Said space is limited by a transverse wall 3 and an annular wall 4. The cylindrical casing 5 of the valve box is located outside said annular wall so that there is formed a chamber 6 between the casing 5 and the wall 4, said chamber serving as an equalization chamber. The wall 4 is partly threaded and serves as attachment for a cup-shaped nut 7 retaining a casing 8 serving as a guide for the piston 9 which communicates in a well-known manner, via an articulately mounted float arm 10, with a float, not shown, in the tank. The piston 9 is in a well-known manner adjustable by means of an adjusting screw 11.

In the wall 3 there is mounted a pipe 12 whose free opening located in the valve box serves as a valve seat for the piston 9 which, via a sealing diaphragm 13, preferably of rubber, can be brought to rest against the opening of the pipe 12. Together with an annular sealing member 14 the diaphragm 13 is secured between the parts 4 and 8.

In the wall portion 4 there are provided two holes 15, 15 which by means of the chamber 6 communicate with a discharge pipe 16 secured in the casing 5 and leading to the tank. The holes 15, 15 are covered by a spring 17 preferably of Phosphor bronze, located around the greatest part of the circumference of the wall 4. Said spring is along its whole length in the middle provided with a ridge 18, see Figs. 3 to 5, the groove of which serves to carry off leakage water and simultaneously reinforces the spring. Said spring is fixed in its position by means of a pin 19 inserted in the chamber 6, an upwardly curved part 20 of said spring resting against said pin.

The valve box may also be constructed in such a manner that the part 4 is loose and the casing 5 forms a fixed part of the valve box.

The float valve operates in the following manner: When the water tank is to be filled to the desired level, the force acting on the float tends to push the piston 9 towards the valve seat, i. e. the pipe 12. This force is, however, counteracted by the overpressure arising in the valve box. This overpressure is caused by the resistance exerted by the spring 17 when the water flows out through the openings 15, 15 to the pipe 16 and from said pipe to the tank. In earlier embodiments it has appeared that, due to the overpressure in the valve box, the water has had a propensity for leaking out at the casing of the piston 9 and for trickling down into the tank, which has caused a dropping noise. This noise is completely avoided here, thanks to the diaphragm 13. When the water in the tank has reached the desired level, the overpressure in the valve box is equalized, and the piston 9 is caused almost instantaneously by the buoyant force acting on the submerged float to abut the mouth of the pipe 12 via the rubber diaphragm, and the float valve is closed. Thus, singing and dropping noises occurring at the closing are avoided.

Figs. 6 to 11 show a second embodiment of the float valve. Those parts which agree with corresponding parts in Figs. 1 to 5, have the same reference characters.

The valve box is obliquely positioned relatively to the inlet pipe 1 to be screwed into the tank wall, i. e. the middle axis of the valve box which coincides with the centre axis of the nozzle 12, forms an angle to the longitudinal middle axis of the inlet pipe 1. The hole in which the inlet pipe is attached, is in this case provided as low as possible in the wall of the tank above the water level without the mechanism of the valve box contacting the surface of the water. Thus, the dimensions of the water tank can be reduced, which is of great importance in water closets where the water tank is placed directly on the closet bowl.

In the pressure chamber 2 of the valve box there is inserted a sleeve-shaped part 21 which corresponds to the annular wall 4 in Fig. 1. The part 21 is provided with an opening 15 which is covered by a spring 17, preferably of Phosphor bronze, having the same function as the spring in the embodiment according to Fig. 1. Another sleeve 22 provided with a number of holes 23 is pushed on to the sleeve 21. Thus, two annular equalization chambers are formed which are separated from each other by the perforated partition 22, and consequently a pressure equalization for the additional valve 17 is obtained.

The valve box is provided with a cover 24 which is attached to the box by means of screws 25. The screws are preferably placed in such a manner that the cover can be attached in one position only, which is necessary with respect to the movement of the float. The cover is in a known manner provided with a guide 8 for a piston 9 which communicates, via an articulately mounted float arm 10, with a float, not shown, in the tank. The piston 9 may be brought to rest against the mouth of the nozzle 12 via a sealing diaphragm 13.

In the embodiment according to Fig. 1, the valve box is provided with an outlet pipe 16 for the water. Here, this pipe is replaced by two outflow openings 26 which are directed backwardly towards the wall of the tank. In said openings there are inserted guide members 27 which contribute to obtain a practically soundless outflow against the wall of the tank. A dropped edge 28 located on the underside of the valve box near the tank wall also contributes essentially to said soundless outflow.

The mode of operation of the valve is analogous to that according to the preceding embodiment.

The great advantage of the device according to the invention is that the valve can be mounted without extra adjustment at different mean pressures in the pipe line net, and that after mounting it functions almost independently of changes in the water pressure. The constructions used up to now always had to be adjusted by a mechanic after the water closet had been installed and yet the valve operated irregularly due to changes in the water pressure.

Having now described our invention, what we claim as new and desire to secure by Letters Patent is:

1. In a float controlled tank filling valve, in combination, an inner cylindrical chamber, a diaphragm closing one end of said chamber, said diaphragm being operated by the tank float, an inlet pipe extending through the opposite plane wall of said chamber and terminating adjacent said diaphragm, an annular chamber surrounding said cylindrical chamber, at least one passage in the wall between said chambers, at least one outlet opening in the outer wall of said annular chamber and spring means closing said passage, said spring means serving to create a relatively high pressure in said cylindrical chamber which counteracts the force exerted by the float until a predetermined level has been attained in the tank when the float force overpowers the chamber pressure and the diaphragm moves rapidly to the inlet closing position.

2. A device according to claim 1 characterized in that said spring means is a band of Phosphor bronze having a longitudinal reenforcing rib, the groove formed on the opposite side of said rib overlying said passage and serving to carry off leakage water, said rib serving to reenforce the spring means.

3. A device according to claim 2 characterized in that the spring means is fixed in position with the groove overlying the center of said passage by means of a pin fixed in the outer wall of said cylindrical chamber, said pin extending into an enlarged portion of said groove.

4. A device according to claim 1 characterized in that a piston is provided on the side of said diaphragm opposite said inlet pipe, said piston being guided in an extension of the valve housing and cooperating with the tank float.

KARL E. ERICSSON.
ERNST G. A. GEBER.

References Cited in the file of this patent
UNITED STATES PATENTS

| Number | Name | Date |
|---|---|---|
| 654,522 | Coiney | July 24, 1900 |
| 1,038,014 | Stack | Sept. 10, 1912 |
| 1,248,650 | Gustafson | Dec. 4, 1917 |
| 1,313,889 | Ford | Aug. 26, 1919 |
| 1,903,816 | Hanson | Apr. 18, 1933 |
| 2,020,463 | Fillmann | Nov. 12, 1935 |